Nov. 14, 1939.  H. W. HEY  2,180,330
GEAR SHIFTING MECHANISM FOR MOTOR VEHICLES
Filed Feb. 23, 1937   3 Sheets-Sheet 3
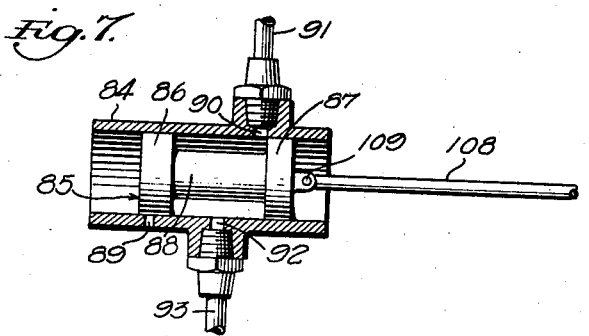
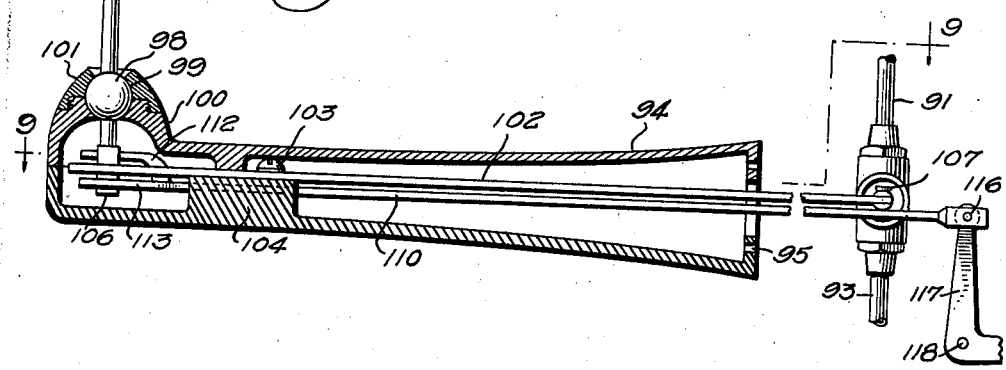
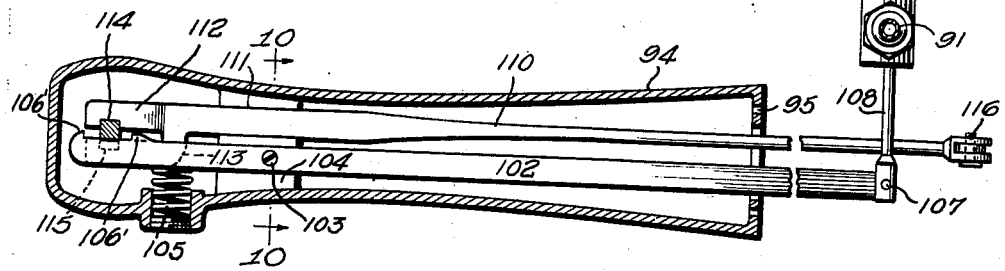
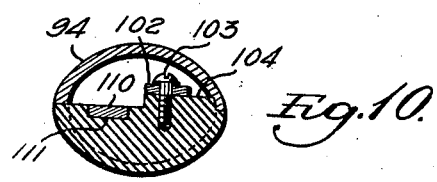
Inventor
HENRY W. HEY Patented Nov. 14, 1939

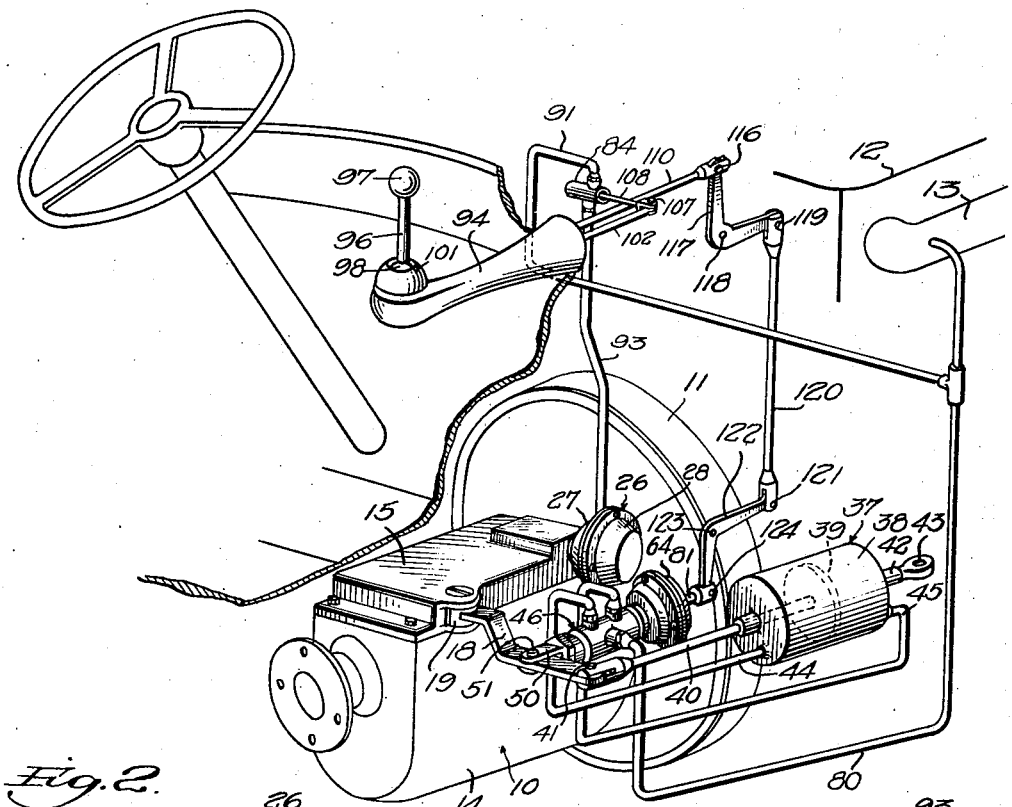
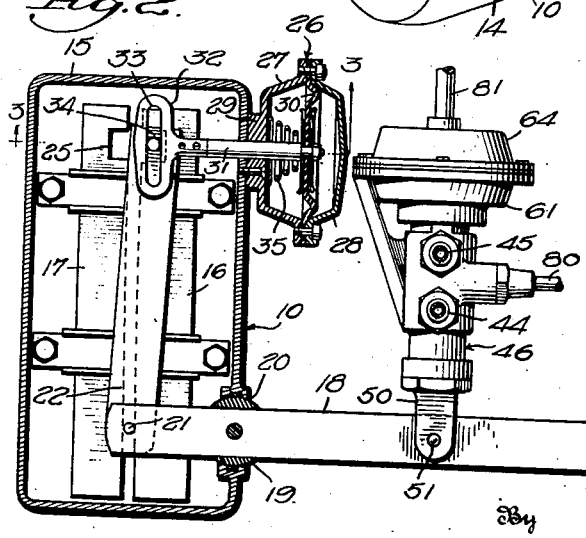
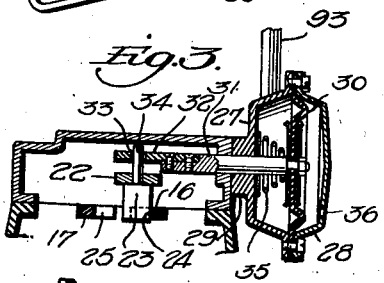

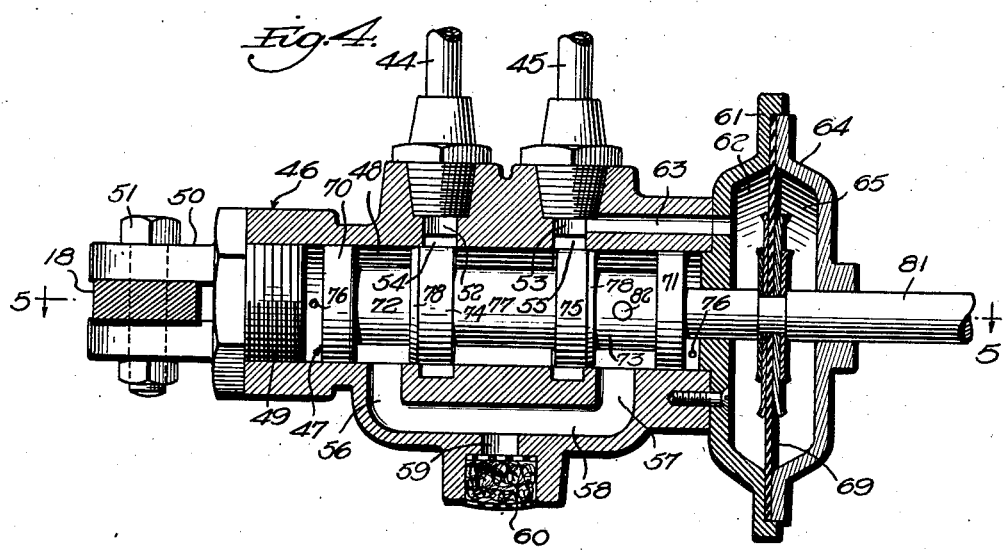

2,180,330

UNITED STATES PATENT OFFICE

2,180,330

GEAR SHIFTING MECHANISM FOR MOTOR VEHICLES

Henry W. Hey, Richmond, Va., assignor to Automatic Shifters, Inc., Richmond, Va., a corporation of Virginia Application February 23, 1937, Serial No. 127,321

26 Claims. (Cl. 74—335)

This invention relates to gear shifting mechanisms for motor vehicles.

Numerous types of fluid pressure actuated operating mechanisms have been proposed for shifting the gears of a motor vehicle transmission. For example, it has been proposed to provide power means for shifting the gears of a motor vehicle and controlled by a relatively small lever readily accessible to the driver. Such a mechanism is advantageous in that it permits the floor boards of the driver's compartment of the vehicle to be cleared and thus allow the comfortable seating of three persons in the front seat. Moreover, a device of this character permits the use of a manually operable shifting handle which is more accessible to the driver than a conventional gear shift lever, and which partakes of relatively short movement into its various gear positions.

In the prior patent of Edward G. Hill and Henry W. Hey, No. 2,030,838, granted February 11, 1936, there is disclosed a highly efficient gear shifting mechanism embodying the general characteristics referred to. In such mechanism a selector handle is employed for controlling the shifting operation and the apparatus permits the practice of preselection, any gear position being capable of being selected for operation prior to disengagement of the clutch. While some drivers prefer a shifting mechanism of the preselection type, other drivers prefer a shifting mechanism wherein the shifting operations are carried out in the conventional manner, namely, by first disengaging the clutch, and then shifting the gears.

While a mechanism of the type shown in the prior patent referred to may be operated conventionally so far as the sequence of operation of the clutch and transmission is concerned, the same characteristics which permit preselection also prevent the shifting operation from being controlled at every point in its movement by the manually operable handle. While some drivers prefer a shifting apparatus which is capable of preselecting, as previously stated, many drivers prefer a shifting apparatus wherein each shifting movement exactly follows the movement of the manually operable handle.

An important object of the present invention is to provide a novel fluid pressure actuated mechanism for shifting the gears of a motor vehicle, wherein the shifting operation is controlled by a manually operable handle the position of which always corresponds to the position of the shiftable elements of the transmission as is true in a conventional lever-shifted transmission.

A further object is to provide an apparatus of the character referred to wherein the shifting operation will always stop instantaneously upon the stoping of the movement of a manually operable handle, and wherein the piston of the shifting motor will be "vacuum suspended" whenever its movement is arrested, thus providing a mechanism wherein movement of the piston is instantaneously responsive to movement of the manually operable handle.

A further object is to provide a shifting mechanism wherein a follow-up valve mechanism controls the operation of the shifting motor in accordance with movement of the manually operable handle, and wherein the novel features of the valve mechanism coordinate the operations of the other elements of the aparatus to provide a particularly efficient shifting mechanism.

A further object is to provide a shifting mechanism controlled by a follow-up valve mechanism having two valve elements relatively movable and adapted to assume relative neutral positions to stop the movement of the piston of the shifting motor, the valves, when in such relative positions, affording limited communication between both ends of the shifting motor and the source of pressure differential, whereby the shifting motor is conditioned for instantaneous operation upon movement of the manually operable lever.

A further object is to provide a follow-up valve mechanism of the character referred to which provides "pressure suspension" of the piston of the shifting motor whenever its movement is arrested, and wherein the features of the valve which provide such operation also are utilized to prevent the valves from "hunting," and thus causing the two valve elements to operate in perfectly coordinated relation.

A further object is to provide means in an apparatus of the character referred to for reacting against the manually operable handle any resistance which is encountered by the piston of the shifting motor in effecting any shifting operation, thus providing the manually operable handle with the highly desirable "feel" which is present in a conventional transmission, and whereby the shifting operation may be efficiently carried out.

A further object is to utilize the reaction through which the "feel" is provided in the manually operable handle for influencing the operation of the follow-up valve mechanism to provide a particularly smooth and efficient operation between the elements of the valve mechanism.

A further object is to provide a single manually operable handle for controlling the crossing over of the shifting between the two shift rails of the transmission and for controlling the longitudinal shifting motor, and to provide means associated with the mechanism to permit the manually operable handle to partake of substantially the same forward and rearward movement when employed in connection with transmissions wherein the two shift rails move different distances.

Other objects and advantages of the invention will become apparent during the course of the following description.

In the drawings I have shown one embodiment of the invention. In this showing:

Figure 1 is a perspective view of the mechanism associated with parts of a motor vehicle, a portion of the latter being broken away, Figure 2 is a horizontal sectional view through the cover of the transmission showing the shift rail selecting and actuating mechanism, parts being shown in elevation, Figure 3 is a detail vertical section on line 3—3 of Figure 2, Figure 4 is a vertical longitudinal sectional view through the main valve mechanism, Figure 5 is a horizontal sectional view on line 5—5 of Figure 4, Figure 6 is a transverse vertical sectional view on line 6—6 of Figure 5, Figure 7 is a detail sectional view of the crossover control valve, Figure 8 is a vertical longitudinal sectional view through the selector lever supporting arm, parts being shown in elevation, Figure 9 is a horizontal sectional view taken substantially on line 9—9 of Figure 8, and, Figure 10 is an enlarged transverse sectional view on line 10—10 of Figure 9.

Referring to Figure 1, the numeral 10 designates a motor vehicle transmission which may be of the conventional synchronizing type, as will become apparent. The transmission is arranged rearwardly of the usual clutch 11 by means of which power is transmitted from the rear end of a motor 12. This motor includes an intake manifold 13 which is preferably used as the source of pressure different from that of the atmosphere, for operating the shifting means to be described.

The transmission includes the usual casing 14, and in the present embodiment of the invention this casing is provided with a cover plate 15 which may support all of the mechanical elements for selecting and transmitting shifting movement to the shift rails. As shown in Figure 2, shifting of the gears is accomplished by transmitting longitudinal movement to a low and reverse gear shift rail 16 and a second and high gear shift rail 17. These elements, and the elements of the transmission shifted thereby form no part of the present invention and need not be referred to in detail.

A horizontal shift lever 18 extends laterally from one side of the transmission cover adjacent the rear end thereof, as shown in Figures 1 and 2, and is mounted in a cylindrical rocker 19 mounted in a similarly shaped opening 20 in the adjacent wall of the transmission cover, thus supporting the lever 18 for rocking movement on a vertical axis. The end of the lever 18 within the transmission is pivotally connected as at 21 to one end of a shift link 22. The other end of this link is provided with a depending lug 23 selectively engageable in notches 24 and 25 formed in the respective shift rails 16 and 17.

A crossover motor indicated as a whole by the numeral 26 is adapted to shift the lug 23 between the respective notches 24 and 25. The crossover motor includes a pair of casing sections 27 and 28, the former of which has a bearing portion 29 secured against the side of the transmission cover. A flexible diaphragm 30 is clamped between the sections of the crossover motor casing and is connected to the outer end of a slidable shaft 31. The inner end of the shaft 31 is provided with a head 32 elongated longitudinally with respect to the transmission and provided with a similarly elongated slot 33 receiving an upwardly projecting pin 34 carried by the adjacent end of the shift link 22.

Referring to Figures 2 and 3 it will be noted that a spring 35 is arranged in the casing section 27 to urge the diaphragm 30 in one direction. Movement of the diaphragm in the opposite direction is effected by connecting the casing section 27 to a source of vacuum, such as the intake manifold 13, in a manner to be described. The casing section 28 is provided with a vent opening 36 to permit the exhausting of air from the casing 27 to result in movement of the diaphragm 30 to the left as viewed in Figures 2 and 3 under which conditions the lug 23 will be arranged in the notch 25 to select the second and high gear shift rail 17 for operation. When atmospheric pressure is present in the casing 27, the biasing action of the spring 35 places the lug 23 in the notch 24, thus preparing the low and reverse gear shift rail 16 for operation.

A differential pressure motor indicated as a whole by the numeral 37 (Figure 1) is adapted to actuate the lever 18 to transmit longitudinal movement to the selected shift rail. The motor 37 comprises a cylinder 38 having a piston 39 mounted to reciprocate therein and carried by a piston rod 40, extending through one head of the cylinder. The rear end of the rod 40, as shown in Figure 1, is pivotally connected to the free end of the lever 18 as at 41. The cylinder 38 may be suitably supported to permit it to partake of the slight movement necessary to compensate for the arcuate path of travel of the pivot 41. For example, the forward end of the cylinder 38 may be provided with a supporting bar 42 having an eye 43 adapted to be pivotally connected to any suitable stationary part of the vehicle. The forward and rear ends of the cylinder 38 are adapted to be connected to the intake manifold 13 or to the atmosphere through pipes 44 and 45 respectively.

A valve mechanism for controlling the operation of the motor 37 is shown in detail in Figures 4, 5 and 6 of the drawings. This valve mechanism comprises a pair of valve elements respectively indicated as a whole by the numerals 46 and 47, the former being provided with a longitudinal bore 48 in which the valve element 47 is axially slidable. In the present embodiment of the invention the valve elements are arranged in axial alinement and both are mounted to partake of movement as will become apparent. The valve element 46 has one end threaded for the reception of a plug 49 which carries a yoke 50 pivotally connected as at 51 to the lever 18. Accordingly it will be apparent that the position of the valve element 46 will be determined in accordance with the position of the lever 18. However, it will become apparent that the valve device 46 need not be connected to the lever 18 but may be connected to any element which is actuated upon movement of the piston 39.

The valve element 46 is provided with a pair of radial ports 52 and 53 communicating with annular grooves 54 and 55 respectively within the bore 48 and connected respectively to the pipes 44 and 45. The pipes referred to may be formed throughout their lengths, or through part of their lengths of flexible relatively heavy hose, such as heavy fabric-reinforced rubber hose to permit relative movement between the valve element 46 and the cylinder 38, as will become apparent. The valve element 46 is further provided with a pair of radial ports 56 and 57 connected to each other by a passage 58 which may be cast in the body of the valve element 46, as shown in Figure 4. The passage 58 communicates with an atmospheric port 59, and this port communicates with the atmosphere through a body of air cleaning material 60.

At the end thereof opposite the yoke 50, the valve element 46 is provided with an annular flange 61 which is recessed to form a chamber 62, and this chamber is connected to the port 53 through a passage 63. A cap 64 is arranged over the flange 61 and is recessed to form a chamber 65. The chamber 65 communicates with a passage 66 formed in the cap 64, and the passage 66 in turn communicates with a passage 67 formed in the flange 61. The valve element 46, as shown in Figure 5, is provided with a passage 68 formed therein and communicating at its ends respectively with the passage 67 and the annular passage 54. A flexible diaphragm 69 is clamped between the flange 61 and cap 64 to be influenced by changes in the pressures in the chambers 62 and 65.

The valve 47 is provided with a pair of end heads 70 and 71 slidable in the bore 48, and these heads are connected by shank portions 72 and 73 to inner spaced heads 74 and 75. The spaces within the bore 48 beyond the heads 70 and 71 are vented to the atmosphere at 76 to prevent the entrapment of air pressure within the ends of the bore, which would interfere with the free movement of the valve 47.

The heads 74 and 75 are connected by a central shank portion 77, and the remote portions of the heads 74 and 75 are slightly tapered as at 78. Particular attention is invited to the fact that the inner limits of the heads 74 and 75 are spaced apart a distance slightly greater than the distance between the inner limits of the annular grooves 54 and 55. Accordingly when the valve elements 46 and 47 occupy the relative neutral positions shown in Figures 4 and 5, both of the pipes 44 and 45, and consequently both ends of the cylinder 38, have limited communication with the space between the heads 74 and 75. The latter space communicates with a radial port 79 (Figures 5 and 6) and this port is connected to a pipe 80 leading to the intake manifold 13, as shown in Figure 1.

An operating stem 81 is provided for the valve 47. As shown in Figure 4, this stem has its inner end connected by a pin 82 to the valve 47, and the stem 81 is slidable in bearing openings 83 formed in the flange 61 and cap 64. The stem 81 is connected to the diaphragm 69, and accordingly it will be apparent that movement of the stem 81 in a manner to be described flexes the diaphragm 69. The total relative movement between the two valve elements and the parts carried thereby, is very slight, as will be explained, and accordingly movement of the stem 81 imparts only slight movement to the diaphragm 69.

A valve mechanism for controlling the operation of the crossover motor 26 is shown in Figure 7. Such mechanism comprises a valve casing 84 in which is slidable a valve 85 having spaced heads 86 and 87 connected by a shank 88. The valve casing 84 is provided with an atmospheric port 89 which is normally covered by the head 86, as will become apparent. A port 90 communicates with the interior of the valve casing 84 and is connected by a pipe 91 to the pipe 80, which leads to the intake manifold 13, as previously described. The valve casing 84 is provided with a third port 92 connected by a pipe 93 to the crossover motor casing 27. The valve 85 is normally biased to the position shown in Figure 7 by means to be described, and accordingly the crossover motor casing 27 is normally connected to the intake manifold through the ports 90 and 92.

A manually operable mechanism for controlling the valve mechanisms shown in Figures 4, 5, 6 and 7 is illustrated in Figures 1, 8 and 9. A hollow arm 94 may be secured to the instrument panel of the vehicle and may extend rearwardly thereof, as shown in Figure 1. This arm may be provided with openings 95 for the reception of bolts or screws by means of which the arm 94 may be secured to the panel. As a matter of manufacturing expediency the arm 94 may be divided horizontally into complementary sections which may be secured together in any suitable manner.

A manually operable lever 96 is supported by the rear end of the arm 94 and may be provided at its upper end with a small knob 97. The lever 96 is provided with a ball 98 mounted for universal movement in a socket 99 formed in part by the upwardly extending rear end 100 of the arm 94 and in part by a cap 101 secured to the extension 100. A lever 102 is pivotally supported as at 103 upon a boss 104 formed within the arm 94, this lever accordingly turning horizontally about a vertical axis. A spring 105 engages the rear end of the lever 102 to tend to turn it in a clockwise direction as viewed in Figure 9. The rear end of the lever 102 has a straight portion bearing against the squared lower end 106 of the lever 96 and forward and rearward movement of the lower end 106 of the handle is limited by contact with lugs 106' (Figure 9). The forward end of the lever 102 is pivotally connected as at 107 to one end of an operating stem 108, the other end of this stem being connected as at 109 (Figure 7) to the valve 85.

A bar 110 is mounted within the arm 94 and has a portion with parallel edges mounted to slide in a guide 111 formed in the arm 94 near the rear end thereof. The rear end of the bar 110 terminates in a pair of vertically offset arms 112 and 113 respectively provided in their inner edges with notches 114 and 115. These notches are adapted to selectively receive the squared lower end 106 of the lever 96. It will become apparent that when the squared end 106 is in engagement with the notch 114, second or high gear may be selected for operation, and when the squared end 106 is arranged in the notch 115, first or reverse gear may be selected. The arm 113 of the bar 110 is arranged a greater distance from the center of the ball 99 than the arm 112. Accordingly a given movement of the lever 96 transmits greater movement to the bar 110 when the squared end 106 is arranged in the notch 115 than when arranged in the notch 114, thus compensating for the greater movement which is necessary in operating the first and reverse gear shift rail 16 in most transmissions.

It will be apparent, of course, that when the arm 94 is secured to the instrument panel in the manner described, such panel will be provided with a suitable opening to permit the lever 102 and bar 110 to project therethrough. The rear end of the bar 110 is pivotally connected as at 116 to one arm of a bell crank lever 117, pivotally supported intermediate its ends as at 118 in any suitable manner. The other arm of the bell crank lever 117 is pivotally connected as at 119 to the upper end of a link 120, and the lower end of this link is pivotally connected as at 121 to one arm of a bell crank lever 122. The bell crank lever is pivoted intermediate its ends as at 123 and has its other arm pivotally connected as at 124 to the forward end of the valve stem 81. Thus it will be apparent that when the lever 96 is moved forwardly and rearwardly with the lower end of the lever in one of the notches 114 or 115, movement will be transmitted through the mechanical connections referred to, to the valve element 47.

The operation of the apparatus is as follows:

Assuming that the vehicle is at a standstill and the driver desires to pass through the usual sequence of gear ratios for forward movement, the clutch pedal will be depressed, whereupon the operator may move the handle 96 toward the left as viewed in Figure 1 and then rearwardly. Under such conditions, the handle 96 will occupy a position corresponding to the low gear position of a conventional gear shift lever, and the parts of the apparatus operate to provide the usual low gear ratio.

The movement of the handle 96 to the left in neutral position in the manner stated moves the lower end 106 of the handle downwardly or toward the observe in Figure 9 which operation turns the lever 102 about its pivot 103 and at the same time arranges the lower end of the handle in the notch 115. The movement transmitted to the lever 102 moves the valve stem 108 upwardly as viewed in Figure 9 to the left as viewed in Figure 7, and this operation causes the valve head 87 to cover the vacuum port 90, while the valve head 86 moves to the left of the port 89, thus admitting air into the port 92. This port communicates through the pipe 93 with the interior of the crossover motor casing 27 (Figures 2 and 3) and accordingly atmospheric pressure will be established on opposite sides of the diaphragm 30. The spring 35 thus will move the shaft 31 to the right as viewed in Figures 2 and 3, and the head 32 will move the pin 34 to the right to place the lug 23 (Figure 3) in the notch 24.

Obviously the shift link 22 (Figure 2) is free to swing about the pivot 21 to permit the lug 23 to be arranged in the notch 24 in the manner stated, and thus the low and reverse gear shift rod is selected for actuation upon transverse movement of the handle 26 in the manner stated.

Rearward movement of the handle 96 will then cause the main valve mechanism to establish differential pressures in opposite ends of the cylinder 38 to effect movement of the shift rail 16 in accordance with the movement of the handle 96. As previously stated, the inner limits of the valve heads 74 and 75 (Figures 4 and 5) are spaced apart a distance slightly greater than the inner limits of the annular grooves 54 and 55. Moreover, the remote portions of the valve heads 74 and 75 are slightly tapered so that initial movement of the valve 47 will connect one or the other of the ports 54 or 55 to the atmosphere. Upon initial rearward movement of the handle 96, the bar 110 will rock the bell crank lever 117, thus moving the link 120 downwardly. This action rocks the bell crank lever 122 whereby the lower arm of this lever will move the valve stem 81 rearwardly. Initial rearward movement of the valve stem 81 causes the valve 47 to move slightly to the left of the position shown in Figures 4 and 5, whereupon the valve head 74 will slightly increase communication between the annular groove 54 and the vacuum space between the valve heads 74 and 75, this space being connected to the intake manifold through port 79 (Figure 5) and pipe 80. At the same time, movement of the valve head 75 will close the slight communication which previously existed between the annular groove 55 and the vacuum space between the valve heads, and will establish communication between the groove 55 and the atmospheric space to the right of the valve head 75 in Figure 4. In this connection it will be noted that the two spaces beyond the remote limits of the valve heads 74 and 75 both communicate with the atmosphere through ports 56 and 57, passage 58 and port 59.

Thus it will be apparent that initial movement of the valve 47 in the manner described slightly increases the degree of communication between the pipe 44 and the intake manifold and establishes communication between the pipe 45 and the atmosphere. The latter pipe communicates with the forward end of the cylinder 38 while the pipe 44 communicates with the rear end of the cylinder, and accordingly it will be apparent that the piston 39 will start to move rearwardly. This operation rocks the lever 18 in a clockwise direction as viewed in Figure 2 and transmits forward movement to the shift rail 16 through the shift link 22.

As the handle 96 is moved progressively rearwardly, approximately the same degree of communication will be maintained between the pipe 44 and the source of vacuum and between the pipe 45 and the atmosphere since the valve element 46 is connected to the lever 18 and accordingly moves rearwardly with the outer end of this lever. In other words, the valve element 46 moves in the same direction as the valve element 47 and maintains a position slightly in advance of a neutral position with respect to the valve 47 so long as the rearward movement of the handle 96 continues. Assuming that movement of the handle 96 should be arrested at any point, it will be apparent that very slight movement of the valve element 46 with respect to the valve element 47 would reestablish the relative neutral positions of the valve elements. Under such conditions, the valve head 75 would close communication between the groove 55 and the atmosphere and would reestablish restricted communication between the groove 55 and the vacuum space between the valve heads 74 and 75. Thus air will be exhausted from the forward end of the cylinder 38 and movement of the piston 39 will be arrested. In other words, upon the stopping of the movement of the handle 96, the piston 39 will be promptly "vacuum suspended" that is, equal vacuum will be established on opposite sides of the piston 39, and this feature of the apparatus is of extreme importance as will become apparent.

Assuming that the handle 96 is moved continuously from the neutral position to the low gear position, the piston 39 will similarly move continuously, the valve element 46 maintaining a position slightly in advance of the valve element 47 to continue the admission of air into the forward end of the cylinder 38 and the exhaustion of air from the rear end thereof. Rearward movement of the upper end of the handle 96 is limited by engagement of the lower end 106 with the forward lug 106' and such position of the lever 96 is the low gear position thereof. When such position is reached, movement of the valve element 47 to the left as viewed in Figure 4 will be arrested, and accordingly the piston 39 of the shifting motor can only move a further distance sufficient to restore the relative neutral positions of the valve elements, whereupon the vacuum suspension of the piston 39 will be effected in the manner described. When the piston 39 reaches such position, the shift rail 16 will be in the low gear position, whereupon the conventional clutch and accelerator operations may be performed to start the vehicle in motion.

When the vehicle has attained sufficient momentum in low gear, the clutch pedal may be depressed whereupon the operator may move the handle 96 forwardly to neutral position, to the right in such position and then forwardly into the second gear position, exactly in accordance with the conventional operation of the usual gear shift lever. As previously stated, the piston 39 will have been vacuum suspended in the low gear position at the rear end of the cylinder 38, and upon initial forward movement of the handle 96, air will be admitted into the rear end of the cylinder 38 to effect forward movement of the piston 39. It has been found that greater rapidity of action of the piston 39 may be accomplished by vacuum suspending the piston and then admitting air into one end of the cylinder than can be obtained by arresting movement of the piston with atmospheric pressure present on both sides thereof and exhausting air from one end of the cylinder.

When the handle 96 is moved forwardly from the low gear position the bar 110 will move rearwardly, thus turning the bell crank lever 117 in a counter-clockwise direction to pull upwardly on the link 120. This operation swings the bell crank lever 122 in a counter-clockwise direction and accordingly the valve stem 81 will be moved forwardly or to the right as viewed in Figure 4. The valve element 47 accordingly will be moved forwardly of its neutral position with respect to the valve element 46. Initial forward movement of the valve element 47 will cause the head 74 to close communication between the groove 54 and the vacuum space between the valve heads 74 and 75 and will slightly open communication between the groove 54 and the atmosphere. At the same time, the valve head 75 will uncover the groove 55 to the vacuum space to a slightly increased extent, and accordingly the forward end of the cylinder 38 will remain in communication with the intake manifold while air will be admitted into the rear end of the cylinder.

The piston 39 accordingly will start to move forwardly, the rate of movement of this piston being proportionate to the rate and distance of movement of the valve element 47. Movement of the valve element 47, in turn, is dependent upon movement of the handle 96, and forward movement of this handle will be arrested in neutral position while the handle is being moved to the right to transfer the shift from the shift rail 16 to the rail 17. When forward movement of the piston 96 is arrested, the piston 39 will move a very slight distance forwardly and will transmit similar movement to the valve element 46 to restore the latter to its neutral position with respect to the valve element 47. When such position of the valve elements is reached, both ends of the cylinder 38 will be connected to the intake manifold in the manner described and the piston 39 will remain motionless, with vacuum present on both sides thereof, pending further forward movement of the handle 96 after the crossover operation has been completed.

The transferring of the shift from the rail 16 to the rail 17 is accomplished by movement of the handle 96 to the right in neutral position. Under such conditions, the lower end 106 of the handle 96 will move upwardy or away from the observer in Figure 9, thus being transferred from the notch 115 to the notch 114. At the same time, the spring 105 will urge the adjacent end of the lever 102 in the same direction, maintaining it in contact with the lower end 106 of the handle. Thus the lever 102 will turn slightly in a clockwise direction as viewed in Figure 9, and the valve 85 will be restored to the position shown in Figure 7.

With the crossover valve 85 in the position referred to, the atmospheric port 89 will be closed and the ports 90 and 92 will be in communication to connect the casing 27 of the crossover motor to the intake manifold. Thus air pressure in the casing 28, operating against the diaphragm 30, will move the shaft 31 to the left as viewed in Figure 2, and the head 32 will swing the shift link 22 to transfer the lug 23 (Figure 3) to the notch 25. Accordingly the second and high gear shift rail 17 will be selected for operation.

The operator may now move the handle 96 forwardly into second gear position. Initial forward movement of the handle 96 moves the valve element 47 forwardly, or to the right as viewed in Figure 4, in which case the valve head 74 will close communication between the annular groove 54 and the vacuum space and will open it to the atmosphere through port 56. Partial vacuum having existed to an equal extent in both ends of the cylinder 38 when the piston 59 was in neutral position, the admission of air into the pipe 44 and into the rear end of the cylinder 38 causes immediate forward movement of the piston, and this piston will continue to move forwardly so long as corresponding movement of the handle 96 takes place. The movement of the handle 96 may be continued forwardly until the lower end 106 of the handle contacts with the rear lug 106', thus preventing further forward movement of the handle. The lug 106' referred to is arranged in such position that it will arrest movement of the handle 96, and consequently movement of the valve element 47, just prior to the point at which the piston 39 reaches the full second gear position. In other words, the piston 39 is permitted to move a sufficient additional distance to restore the relative neutral positions of the valve elements 46 and 47 whereby both ends of the cylinder 38 will again be placed in restricted communication with the intake manifold to vacuum suspend the piston.

After the vehicle has attained sufficient momentum in second gear, the handle 96 may be moved rearwardly into the conventional high gear position, in which case the operation of the parts will be the same as for low gear, except that the crossover motor will be unaffected and the lug 23 will remain in engagement with the notch 25 of the second and high gear shift rail 17.

The shift into reverse will be apparent from the foregoing description, the motor 37 functioning in the same manner as for second gear. However, the handle 96 will be moved to neutral position, and then to the left before being moved forwardly into reverse gear position, and accordingly the casing 27 of the crossover motor will be opened to the atmosphere when the handle 96 is moved to the left. Thus the spring 35 will transfer the shift lug 23 to the notch 24 of the shift rail 16, and accordingly the continued movement of the piston 39 after the crossover operation has taken place, will place the gear set in reverse gear.

The spacing of the inner limits of the valve heads 74 and 75 a distance apart slightly greater than the distance between the inner limits of the annular grooves 54 and 55 is highly important. Whenever movement of the handle 96 is stopped, regardless of its position, the valve member 46 immediately assumes a neutral position with respect to the valve member 47, under which condition both ends of the cylinder 38 will be immediately connected to the intake manifold to vacuum suspend the piston 39. Consequently subsequent movement of the lever 96, regardless of the direction of movement, will admit air into one end of the cylinder 38 to cause movement of the piston 39 substantially instantaneously. The response of the piston to movement of the handle 96 is far more rapid than would be possible by the air balancing of the piston 39 and the subsequent exhaustion of air from one end thereof. Accordingly the movement of the piston 39, and consequently the movement of the selected shift rail, takes place simultaneously with the movement of the handle 96 without any lagging or sluggishness.

The porting of the main valve mechanism is important for the additional reason that it permits the minimizing of the relative movements of the valves 46 and 47 to establish differential pressure on opposite sides of the piston 39. Accordingly lost motion between the valves 46 and 47 is almost completely eliminated, it being possible in actual practice to limit this lost motion to a negligible amount such as $\frac{1}{32}''$. Accordingly, when shifting gears, the operator has no sensation whatever of the shifting of the gears lagging behind the movement of the handle 96.

The movement of the handle 96, in accordance with the foregoing description, simulates conventional practice, the gears being shifted in a conventional manner by the operation of the handle 96. Conventional transmissions are now provided with gear synchronizing means to prevent the clashing of the gears of transmissions of the older type, as is well known. The operation of the synchronizing clutches offers a slight resistance to the movement of a conventional gear shift lever before the latter reaches a gear position, and this resistance is felt by the operator of a conventional transmission. Accordingly it is the practice for an operator to momentarily retard movement of the shift lever at the synchronizing point to permit synchronization to take place before completing movement of the shift lever into a gear position.

The present invention provides the handle 96 with "feel" corresponding to that present in a conventional gear shift lever, thus permitting the operator to retard the shifting operation at the proper point in synchronizing transmissions. It will be noted that the diaphragm chambers 62 and 65 communicate with the respective ports 53 and 52 by the passages 63 (Figure 4) and 66, 67 and 68 (Figure 5). Accordingly the chambers 62 and 65 are subjected to the same pressures which affect the motor piston 39.

For example, if the valve stem 81 is moved to the left as viewed in Figure 4, the forward end of the cylinder 38 will be connected to the atmosphere through pipe 45, and the chamber 62 will be similarly opened to atmospheric pressure. However, the rear end of the cylinder 38 will remain in communication with the intake manifold, and the same is true of the chamber 65. Thus the differential pressures in the chambers 62 and 65 exert a force toward the right in Figure 4 to oppose the movement of the valve stem 81 toward the left. The differential pressures present on opposite sides of the diaphragm 69 will depend upon the resistance encountered by the piston 39. For example, through most of its travel, the piston 39 is relatively free to move whenever the valves 46 and 47 are moved out of their relative neutral positions, and only a relatively slight degree of vacuum is necessary to establish sufficient differential pressure to move the piston 39. Ordinarily, therefore, a relatively slight degree of vacuum will exist in the chamber 65 (Figures 4 and 5) when the valve stem 81 is being moved toward the left, and accordingly a correspondingly slight reaction is created against the movement of the valve stem.

When the synchronizing means of the transmission comes into operation, however, the movement of the piston 39 is resisted to a greater extent, thus retarding the movement of the piston while air continues to be exhausted from one end of the cylinder at the same rate. Accordingly the degree of vacuum will increase, and there will be an immediate drop in pressure in the chamber 65 under the conditions being considered, namely, the movement of the valve stem 81 toward the left as viewed in Figure 4. Under such conditions, greater differential pressures will affect the diaphragm 69, thus offering greater resistance to the movement of the valve stem 81, this resistance being felt by the operator through the handle 96. Accordingly the operator may retard the shifting operation to permit the transmission synchronizing means to function, exactly as is done with a conventional transmission.

The same operation takes place upon movement of the valve stem 81 toward the right, except that atmospheric pressure will be present in the chamber 65, and a partial vacuum will be established in the chamber 62, such degree of vacuum depending upon the resistance encountered by the piston 39 in its movement. Thus the air pressure in the chamber 68 will operate against the diaphragm 69 to resist movement of the valve stem 81 to a degree corresponding to the degree of vacuum in the chamber 62.

Attention is invited to the fact that the valve mechanism embodies only two elements, namely, the elements 46 and 47, no valve casing being employed. It also will be noted that the diaphragm 69 is connected between the two independently movable elements of the valve mechanism. Accordingly, differential pressures in the chambers 62 and 65 will resist movement of the valve stem 81, and at the same time will equally react with respect to the valve element 46. In practice it has been found that this action has a distinctly steadying influence on the valve elements 46 and 47 and causes them to move with an extreme degree of smoothness with respect to each other, any tendency of the valve elements to move in a jerky or irregular manner being completely eliminated. Thus the apparatus has been found to provide an extreme degree of efficiency in operation in that the shifting operation substantially exactly follows the movement of the handle 96; the handle 96 is provided with the highly desirable "feel" by means of which the operator can shift in accordance with conventional practice; and the movement of the valve elements takes place with a remarkable degree of smoothness and accuracy.

The arrangement of the valve heads 74 and 75 with respect to the grooves 54 and 55 also assists in improving the operation of the valve mechanism by preventing "hunting". It will be apparent that, when movement of the valve element 47 is stopped and the valve element 46 approaches a neutral position with respect thereto, one of the grooves 54 or 55 will open slightly to the vacuum space around the stem 77 before the exact neutral position is reached. Air will be progressively exhausted from the corresponding end of the motor cylinder 38, thus tending to overcome the inertia of the piston 39 which would tend to cause the piston to carry the valve element 46 beyond its neutral position with respect to the valve element 47. If the inner limits of the valve heads 74 and 75 coincided with the inner limits of the grooves 54 and 55 when the valve elements were in neutral position, it will be apparent that the neutral position would be reached with atmospheric pressure present in one end of the cylinder 38 and partial vacuum in the other end. Accordingly it would be necessary for the valve element 46 to overrun its relative neutral position with respect to the valve 47 in order to balance the pressures on opposite sides of the piston 39. As a matter of fact, overbalancing would take place and the valve element 46 would move back and forth past the exact neutral point with respect to the valve 47 several times before it would come to rest in neutral position, and this disadvantageous operation would destroy the accuracy with which the gear shifting operation follows the movement of the handle 96. The arrangement of the valve heads 74 and 75, therefore, provides vacuum suspension of the piston 39, and also assists in promptly and accurately stopping the piston 39 when movement of the handle 96 is stopped.

It will be noted that the present device includes normally inoperative instrumentalities associated with the actuating lever 18, and the handle 96 through its connections 110, 107, 120, 122 and 81 for direct manual actuation of the lever 18 upon failure of the motor 39. The ends of the valve 47 are spaced only a relatively slight distance from the inner wall of the chamber 62 and the inner end of the plug 49. Under normal conditions, this limited play between the parts is more than sufficient to permit the function of the valve elements in the manner described. Assuming that the power shifting means should fail for any reason, it is possible to shift into first or reverse gear without the power means. It will be noted that the spring 35 of the crossover motor biases the shift lug 23 into engagement with the low and reverse gear shift rail 16. If the shifting apparatus should fail, the operator, by using substantial pressure, may force the handle 96 forwardly or rearwardly to slide the shift rail 16 into one of its gear positions. This is possible due to the limited relative movement between the valve elements 46 and 47, operation of the stem 81 taking up the play between the valve elements, after which the motion of the valve stem 81 will be transmitted to the lever 18 to shift the gears. This is particularly important in cases where the vehicle battery has become discharged and it is necessary to place the vehicle in gear in order to start the motor by pushing or towing the vehicle. Such operation is impossible with other power gear shifting mechanisms.

In many vehicle transmissions, only the gears controlled by the second and high gear shift rail are synchronized, and accordingly such shift rail does not move as far on opposite sides of neutral position as is true of the low and reverse gear shift rail. In the present construction, the handle 96 moves simultaneously with the piston 39, and in order to minimize the movement of the handle 96 when shifting the low and reverse gear shift rail 16, the bar 110 is provided with the offset ends 112 and 113. The end 113 is engaged by the lever end 106 for low and reverse gears and is further from the center of the ball 98 than the offset end 112. Accordingly a given movement of the lever 96 when engaging the end 113 will effect greater movement of the bar 110 than when the lever end 106 engages the offset end 112. Thus the offsetting of the ends 112 and 113 compensates for the difference in the distances of travel of the piston 39 according to the movement of the selected shift rail, and with transmissions of the character referred to the parts may be designed so that the handle 96 moves the same distance forwardly and rearwardly for any gear position. It will be apparent that the lever end 106 is selectively engageable in the notches 114 and 115. Since these notches are unequally spaced from the center of the ball 98, it will be obvious that the lever 96 cannot be moved when the lever end 106 bridges across between both notches 114 and 115, it being necessary for the lever to be moved completely out of one notch and into the other before movement of the lever can take place.

The movement of the handle 96 is limited by engagement of the lower end 106 against the lugs 106'. These lugs are so positioned as to stop the movement of the handle 96 slightly before a gear position is fully reached so as to permit the piston 39 to move the slight additional distance necessary to complete the last increment of movement of the gear shifting operation, and to place the valve elements 46 and 47 in their relative neutral positions with the piston 39 vacuum suspended and thus prepared for the next gear shifting operation.

It will be apparent from the foregoing description that the invention also contemplates the use of the force exerted by the operator's hand in overcoming resistance against movement of the handle 97 to perform useful work in assisting the shifting operation. It will be noted that the reaction provided by pressures on opposite sides of the diaphragm 69 to resist the movement of the manually operable lever can be present only because an equal and opposite reaction is present against the mechanism with which the shaft 81 and diaphragm 69 are associated, namely, the valve element 46 and yoke 50. Accordingly when the operator exerts force against the handle 97 to overcome the resistance thereagainst, the force exerted against the operator's hand is transmitted through the valve element 46 and yoke 50 to the lever 18 to assist the motor 37 in performing the shifting operation.

The work thus performed by the operator is preferably a relatively small proportion of the work required for operating the lever 18 but is sufficient to permit the use of a smaller motor 37 than would be required if such motor performed all of the work required in each shifting operation. In this connection it may be considered that two longitudinal shift motors are provided, namely, the motor 37 and the motor provided by the combination of elements through which "feel" is transmitted to the hand of the operator. In any fluid pressure motor, it is well known that the relatively movable parts of the motor, such as the piston and cylinder heads, are subjected to equal and opposite reactions. In the present case the motor 37 has one of its relatively movable parts, namely the cylinder 38, anchored as at 43. In the auxiliary motor comprising the diaphragm 69, its chambers 62 and 65 and associated elements, neither of the relatively movable parts is fixed, the diaphragm transmitting its reaction to the hand of the operator while the equal reaction against the casing surrounding the diaphragm is transmitted through the valve member 46 and yoke 50 to the lever 18.

The force transmitted by the hand of the operator to the diaphragm 69 to overcome the reaction thereagainst will be equal to the force transmitted through the valve element 46 to the lever 18 and thus the auxiliary motor assists the main motor 37 to a predetermined extent. The relation between the amount of work performed by the two motors referred to will depend upon several conditions in the embodiment of the invention illustrated. For example, the force directly generated by the auxiliary motor in proportion to that directly generated by the motor 37 will depend upon the respective areas of the diaphragm 69 and the motor piston 39. The effective transmission of the force generated by the two motors will depend upon the effective lengths of the lever arms of the lever 18 against which the motor forces are applied.

Therefore if the effective area of the diaphragm 69 is one-half the area of the piston 39, the auxiliary motor is capable of exerting one-half the force exerted by the motor 37. Under such conditions, if the pivot pin 51 is connected to the lever 18 midway between the pivot 19 of the lever and the pivot pin 41 the auxiliary motor will perform in the shifting operation one-quarter of the work performed by the motor 37. Obviously these relationships may be designed to permit the auxiliary motor to perform any desired proportion of the work required in the shifting operation.

Attention is also invited to the fact that the play between the two valve elements 46 and 47 is not taken up during the normal operation of the apparatus, that is, so long as the power shifting means is in operation. The characteristics of the mechanism are such that the play referred to may be relatively slight but still sufficient to prevent the direct application of force for the purpose of providing for manual shifting, such operation occurring only upon a failure of the apparatus to function in accordance with its intended operation. The vacuum or pressure suspension of the piston 39 renders this element instantaneously responsive to changes in the relative positions of the valves 46 and 47. Thus when movement is manually transmitted to the valve 47 to move it away from its neutral position with respect to the valve 46, movement of the piston, and consequently of the lever 18 and valve 46, will be substantially instantaneous and accordingly the valve member 46 will be advanced in a follow-up action with respect to valve member 47 without permitting the play between the valve members to be taken up.

The crossover motor spring 35 biases the finger 23 into engagement with the notch 24 of the low and reverse shift rail and accordingly such rail is automatically selected for operation upon a failure in power or in the source of vacuum. Under the latter conditions, therefore, the operator is enabled to move the handle 97 to take up play between the valve members 46 and 47, whereupon a direct manual shifting operation can be performed to move the shift rail 16 either into low or reverse gears.

The present construction embodies some of the broad features of operation disclosed and claimed in my copending applications Serial Nos. 162,051, filed September 1, 1937, and 169,288, filed October 15, 1937. For example, the broad feature of providing a follow-up valve mechanism for a shifting motor, so constructed as to pressure suspend the piston of the shifting motor whenever movement of the handle is stopped is described and claimed in my copending application Serial No. 162,051, referred to, together with such feature in combination with the manual shifting of the elements upon a failure in power and the feature of selecting one of the shift rails for manual operation under the same conditions. In my copending application Serial No. 169,288, also referred to above, I have described and claimed various features such as the provision of the manual lever with "feel," in any position of the parts, proportional to the resistance encountered by the shifting motor in its operation; the feature of causing the operator to perform part of the work by employing the "feel" mechanism as a small auxiliary motor, etc. In other words, the present invention is limited, in combination with other features, to the specific arrangement wherein the valve members 46 and 47 comprise a floating valve mechanism and wherein each valve is movable independently of the other valve.

Compared to other types of proposed power mechanisms of this character, the present device is characterized by its extreme simplicity, and the apparatus may be relatively cheaply constructed. The apparatus is particularly adapted for use as a gear shifting mechanism because of its extreme accuracy of operation combined with the "feel" provided in the handle 96, by means of which the operator may accurately "feel" the way into a gear position strictly in accordance with conventional practice. It is particularly noted that the apparatus may be operated without the necessity for an operator having to learn to perform any operation which is in any way different from a conventional shift. The use of the apparatus as a shifting mechanism further permits the floor boards to be completely cleared, whereby three persons may occupy the front seat of the vehicle without inconvenience and without interfering with the operation of the shift handle 96.

In this connection, it is also noted that conventional gear shift levers partake of substantial movement at their upper ends, and accordingly it is the practice to locate such levers sufficiently close to the driver to permit him to make the various shifting movements without unnecessary inconvenience. Conventional shift levers accordingly interfere with the seating of three persons in the front seat of a vehicle. With the present invention, the handle 96 may be arranged further rearwardly than a conventional gear shift lever, thus permitting it to be more easily reached, and at the same time, the distance of movement of the knob 97 is reduced very materially as compared with the knob of a conventional gear shift lever. Thus a driver is required to reach only a short distance for the shift knob 97 and he is required to move such knob only a limited distance for any gear position.

While the invention as specifically described above is for use in connection with a conventional three forward speed and reverse automobile transmission and this specific embodiment is particularly adapted for such use, it will be readily apparent that this type of transmission operating mechanism is adapted for use in connection with various other types of shiftable transmissions whether stationary or in vehicles. For example, this invention may readily be used in connection with a marine forward and reverse type transmission and various other types of automotive and stationary transmissions, as will be apparent to those skilled in this art.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The combination with a transmission having a shiftable transmission operating member movable in oposite directions from a neutral position into different transmission setting positions, of a differential fluid pressure motor connected to said shiftable member, a source of non-atmospheric pressure, a floating valve mechanism comprising a pair of freely independently movable valve members normally arranged in relative neutral positions connecting both ends of said motor to said source and operative when out of said relative neutral positions to connect either end of said motor to said source and the other to the atmosphere, means for moving one of said valve members out of its relative neutral position with respect to the other valve member, means responsive to operation of said motor for moving said other valve member to tend to restore it to said relative neutral position, and means for resisting movement of said first named valve member in either direction from said relative neutral position, said last named means being constructed and arranged to be inoperative when said valve members are in relative neutral positions.

2. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of independently movable valve members normally arranged in relative neutral positions connecting both ends of said motor to said source and operative when out of said relative neutral positions to connect either end of said motor to said source and the other to the atmosphere, means for moving one of said valve members out of its relative neutral position with respect to the other valve member, means responsive to operation of said motor for moving said other valve member to tend to restore it to said relative neutral position, and means responsive to differential pressures in said motor for resisting movement of said first named valve member away from said relative neutral position.

3. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of independently movable valve members normally arranged in relative neutral positions connecting both ends of said motor to said source and operative when out of said relative neutral position to connect one end of said motor to said source and the other end to the atmosphere to generate a force in said motor to move said shiftable member, means for moving one of said valve members out of its relative neutral position with respect to the other valve members, means responsive to operation of said motor for moving said other valve member to tend to restore it to said relative neutral position, and means for applying a smaller and substantially proportional force to said first named valve member opposing all movements thereof in a direction away from said relative neutral position simultaneously with the application of said first mentioned force whereby any such movement of said first named valve member will be resisted to a degree substantially proportional to the resistance encountered by said shiftable member.

4. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of independently movable valve members normally arranged in relative neutral positions connecting both ends of said motor to said source and operative when out of said relative neutral position to connect one end of said motor to said source and the other end to the atmosphere to generate a force in said motor to move said shiftable member, means for moving one of said valve members out of its relative neutral position with respect to the other valve member, means responsive to operation of said motor for moving said other valve member to tend to restore it to said relative neutral position, and a fluid pressure operated device for opposing all movements of said first named valve member in a direction away from said relative neutral position simultaneously with the application of said first mentioned force whereby any such movement of said first named valve member will be resisted to a degree substantially proportional to the resistance encountered by said shiftable member.

5. The combination with a transmission having a shiftable transmission operating member movable in opposite directions from a neutral position into different transmission setting positions, of a differential fluid pressure motor, motion transmitting means connected between said motor and said shiftable member, a source of non-atmospheric pressure, a floating valve mechanism comprising a pair of freely independently movable valve members normally arranged in relative neutral positions connecting both ends of said motor to said source, a manually movable control member connected to move one of said valve members out of its relative neutral position to connect either end of said motor to said source and the other end to the atmosphere, the other of said valve members being connected to said motion transmitting means whereby operation of said motor tends to restore said other valve member to said relative neutral position, and means for resisting movement of said first named valve member out of said relative neutral position, said last named means being constructed and arranged to be inoperative when said valve members are in relative neutral positions.

6. The combination with a transmission having a shiftable transmission operating member movable in opposite directions from a neutral position into different transmission setting positions, of a differential fluid pressure motor, motion transmitting means connected between said motor and said shiftable member, a source of non-atmospheric pressure, a floating valve mechanism comprising a pair of independently movable valve members normally arranged in relative neutral positions connecting both ends of said motor to said source, a manually movable control member connected to move one of said valve members out of its relative neutral position to connect either end of said motor to said source and the other end to the atmosphere, the other of said valve members being connected to said motion transmitting means whereby operation of said motor tends to restore said other valve member to said relative neutral position, and means responsive to differential pressures in said motor for resisting movement of said first named valve member away from said relative neutral position.

7. The combination with a transmission having a shiftable transmission operating member movable in opposite directions from a neutral position into different transmission setting positions, of a differential fluid pressure motor, motion transmitting means connected between said motor and said shiftable member, a source of non-atmospheric pressure, a floating valve mechanism comprising a pair of independently movable valve members normally arranged in relative neutral positions connecting both ends of said motor to said source, a manually movable control member connected to move one of said valve members out of its relative neutral position to connect either end of said motor to said source and the other end to the atmosphere, the other of said valve members being connected to said motion transmitting means whereby operation of said motor tends to restore said other valve member to said relative neutral position, and a differential pressure operated device having a movable member responsive to differential pressures in said motor and of such area as to generate a force resisting movement of said first named valve member away from said relative neutral position to a degree less than and proportional to the force generated by said motor.

8. The combination with a transmission having a shiftable transmission operating member movable in opposite directions from a neutral position into different transmission setting positions, of a fluid pressure motor having a pair of chambers and pressure responsive means therebetween connected to said shiftable member, a source of partial vacuum, a floating valve mechanism comprising a pair of freely independently movable valve members one of which is movable in accordance with movement of said pressure responsive means, said valve members being ported to connect either chamber to the atmosphere and the other to said source when the other valve member is moved away from a predetermined relative position with respect to the first named valve member, the ports in said valve members being arranged to connect both of said chambers to said source when said other valve member is in said predetermined relative position, and means for resisting movement of said other valve member away from said relative position, said last named means being constructed and arranged to be inoperative when said valve members are in relative neutral positions.

9. The combination with a transmission having a shiftable transmission operating member movable in opposite directions from a neutral position into different transmission setting positions, of a fluid pressure motor having a pair of chambers and pressure responsive means therebetween connected to said shiftable member, a source of partial vacuum, a floating valve mechanism comprising a pair of independently movable valve members one of which is movable in accordance with movement of said pressure responsive means, said valve members being ported to connect either chamber to the atmosphere and the other to said source when the other valve member is moved away from a predetermined relative position with respect to the first named valve member, the ports in said valve members being arranged to connect both of said chambers to said source when said other valve member is in said predetermined relative position, manually operable means for moving said other valve member, and means for resisting movement of said manually operable means to a degree substantially proportional to the resistance encountered by said shiftable member.

10. The combination with a transmission having a shiftable transmission operating member movable in opposite directions from a neutral position into different transmission setting positions, of a fluid pressure motor having a pressure responsive member therein connected to said shiftable member, a source of non-atmospheric pressure, a floating valve mechanism comprising a pair of independently movable valve members ported to connect both ends of said motor to said source when said valves are in a predetermined relative neutral position, manual means for moving one of said valves away from such position to connect either end of said motor to said source and the other to the atmosphere, means responsive to movement of said pressure responsive member for moving the other valve member in the direction of movement of the first named valve member to tend to restore the relative neutral position of said valve members, and means for resisting movement of said first named valve member away from said relative neutral position to a degree substantially proportional to the differential pressures affecting said pressure responsive member.

11. The combination with a transmission having a shiftable transmission operating member movable in opposite directions from a neutral position into different transmission setting positions, of a fluid pressure motor having a pressure responsive member therein connected to said shiftable member, a source of non-atmospheric pressure, a floating valve mechanism comprising a pair of independently movable valve members ported to connect both ends of said motor to said source when said valves are in a predetermined relative neutral position, manual means for moving one of said valves away from such position to connect either end of said motor to said source and the other to the atmosphere, means responsive to movement of said pressure responsive member for moving the other valve member in the direction of movement of the first named valve member to tend to restore the relative neutral position of said valve members, and fluid pressure operated means connected between said valve members and responsive substantially proportionately to differential pressures in said motor for resisting movement of said manual means in either direction.

12. The combination with a motor vehicle transmission having a pair of shiftable members for providing different gear ratios, of an actuating member for moving said shiftable members, selecting means for determining which shiftable member will be moved upon operation of said actuating member, a differential fluid pressure motor connected to said actuating member, a source of non-atmospheric pressure, a floating valve mechanism comprising a pair of freely independently movable valve members normally arranged in relative neutral positions connecting both ends of said motor to said source and operative when out of said relative neutral position to connect one end of said motor to said source and the other to the atmosphere, manual means connected to control said selecting means and connected to move one of said valve members out of its relative neutral position with respect to the other valve member, means responsive to operation of said motor for moving said other valve member to tend to restore it to said relative neutral position, and means for resisting movement of said first named valve member in either direction from said relative neutral position, said last named means being constructed and arranged to be inoperative when said valve members are in relative neutral position.

13. The combination with a motor vehicle transmission having a pair of shiftable members for providing different gear ratios, of an actuating member for moving said shiftable members, selecting means for determining which shiftable member will be moved upon operation of said actuating member, a differential fluid pressure motor connected to said actuating member, a source of non-atmospheric pressure, a floating valve mechanism comprising a pair of independently movable valve members normally arranged in relative neutral positions connecting both ends of said motor to said source and operative when out of said relative neutral position to connect one end of said motor to said source and the other to the atmosphere, manual means connected to control said selecting means and connected to move one of said valve members out of its relative neutral position with respect to the other valve member, means responsive to operation of said motor for moving said other valve member to tend to restore it to said relative neutral position, and means responsive to differential pressures in said motor for resisting movement of said first named valve member away from said relative neutral position.

14. The combination with a motor vehicle transmission having a pair of shiftable members for providing different gear ratios, of an actuating member for moving said shiftable members, selecting means for determining which shiftable member will be moved upon operation of said actuating member, a differential fluid pressure motor connected to said actuating member, a source of non-atomspheric pressure, a floating valve mechanism comprising a pair of independently movable valve members normally arranged in relative neutral positions connecting both ends of said motor to said source and operative when out of said relative neutral position to connect either end of said motor to said source and the other to the atmosphere to generate a force in said motor to move said shiftable member, manual means connected to control said selecting means and connected to move one of said valve members out of said relative neutral position, means responsive to operation of said motor for moving the other of said valve members to tend to restore it to said relative neutral position, and means for applying simultaneously with the application of said first mentioned force a smaller and substantially proportional force opposing all movements of said first named valve away from said relative neutral position.

15. The combination with a motor vehicle transmission having a pair of shiftable members for providing different gear ratios, of an actuating member for moving said shiftable members, selecting means for determining which shiftable member will be moved upon operation of said actuating member, a differential fluid pressure motor connected to said actuating member, a source of non-atmospheric pressure, a floating valve mechanism comprising a pair of independently movable valve members normally arranged in relative neutral positions connecting both ends of said motor to said source and operative when out of said relative neutral position to connect either end of said motor to said source and the other to the atmosphere to generate a force in said motor to move said shiftable member, manual means connected to control said selecting means and connected to move one of said valve members out of said relative neutral position, means responsive to operation of said motor for moving the other of said valve members to tend to restore it to said relative neutral position, means for applying simultaneously with the application of said first mentioned force a smaller and substantially proportional force opposing all movements of said first named valve away from said relative neutral position, and means for utilizing said second named force for assisting in moving said actuating member.

16. The combination with a motor vehicle transmission having a pair of shiftable members for providing different gear ratios, of an actuating member for moving said shiftable members, selecting means for determining which shiftable member will be moved upon operation of said actuating member, a differential fluid pressure motor connected to said actuating member, a source of non-atmospheric pressure, a floating valve mechanism comprising a pair of independently movable valve members normally arranged in relative neutral positions connecting both ends of said motor to said source and operative when out of said relative neutral position to connect either end of said motor to said source and the other to the atmosphere to generate a force in said motor to move said shiftable member, manual means connected to control said selecting means and connected to move one of said valve members out of said relative neutral position, means responsive to operation of said motor for moving the other of said valve members to tend to restore it to said relative neutral position, and a fluid pressure operated device for opposing all movements of said first named valve member away from said relative neutral position simultaneously with the application of said first mentioned force whereby any such movement of said first named valve member will be resisted to a degree substantially proportional to the resistance encountered by said actuating member.

17. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of independently movable valve members normally arranged in relative neutral positions connecting both ends of said motor to said source and operative when out of said relative neutral positions to connect either end of said motor to said source and the other to the atmosphere, manual means for moving one of said valve members out of its relative neutral position with respect to the other valve member, means responsive to operation of said motor for moving said other valve member to tend to restore it to said relative neutral position, means dependent upon energization of said motor for resisting movement of said first named valve in either direction from said relative neutral position, and normally inoperative instrumentalities associated with said shiftable member and with said manual means, said instrumentalities being operable upon failure of said motor whereby movement of said manual means will actuate said shiftable member.

18. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of independently movable valve members normally arranged in relative neutral positions connecting both ends of said motor to said source and operative when out of said relative neutral positions to connect either end of said motor to said source and the other to the atmosphere, manual means for moving one of said valve members out of its relative neutral position with respect to the other valve member, means responsive to operation of said motor for moving said other valve member to tend to restore it to said relative neutral position, means responsive solely to differential pressures in said motor for resisting movement of said first named valve member away from said relative neutral position, and normally inoperative instrumentalities associated with said shiftable member and with said manual means, said instrumentalities being operable upon failure of said motor whereby movement of said manual means will actuate said shiftable member.

19. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of independently movable valve members normally arranged in relative neutral positions connecting both ends of said motor to said source and operative when out of said relative neutral positions to connect either end of said motor to said source and the other to the atmosphere, manual means for moving one of said valve members out of its relative neutral position with respect to the other valve member, means responsive to operation of said motor for moving said other valve member to tend to restore it to said relative neutral position, and a single reaction means providing a force smaller than and substantially proportional to the force exerted by said motor and acting oppositely between said shiftable member, to assist in moving the latter, and said manual means, whereby the operator, in any position of said manual means and in either direction of movement thereof, will feel a resistance to the movement of said manual means substantially proportional to the resistance encountered by said shiftable member.

20. The combination with a transmission having a shiftable transmission operating member movable in opposite directions from a neutral position into different transmission setting positions, of an actuating member connected to said shiftable member, a differential fluid pressure motor connected to said actuating member, a source of non-atmospheric pressure, a floating valve mechanism comprising a pair of independently axially movable valve members normally arranged in relative neutral positions connecting both ends of said motor to said source, a manually movable control member connected to one of said valve members in axial alignment therewith to move it out of its relative neutral position to connect one end of said motor to said source and the other to the atmosphere, said actuating member being connected to the other of said valve members in axial alignment therewith whereby operation of said motor tends to restore said other valve member to said relative neutral position, means dependent upon energization of said motor for resisting movement of said first named valve member out of said relative neutral position, and normally inoperative instrumentalities operative upon failure of said motor for transmitting movement of said manually movable member through and in axial alignment with said valve members to move said actuating member.

21. The combination with a transmission having a shiftable transmission operating member movable in opposite directions from a neutral position into different transmission setting positions, of an actuating member connected to said shiftable member, a differential fluid pressure motor connected to said actuating member, a source of non-atmospheric pressure, a floating valve mechanism comprising a pair of independently axially movable valve members normally arranged in relative neutral positions connecting both ends of said motor to said source, a manually movable control member connected to one of said valve members in axial alignment therewith to move it out of its relative neutral position to connect one end of said motor to said source and the other to the atmosphere, said actuating member being connected to the other of said valve members in axial alignment therewith whereby operation of said motor tends to restore said other valve member to said relative neutral position, means responsive to differential pressures in said motor for resisting movement of said first named valve away from said relative neutral position to a degree substantially proportional to the degree of energization of said motor, and normally inoperative instrumentalities operative upon failure of said motor for transmitting movement of said manually movable member through and in axial alignment with said valve members to move said actuating member.

22. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of freely independently movable valve members normally arranged in relative neutral positions balancing pressures in the ends of said motor and operative when out of said relative neutral positions to connect either end of said motor to said source and the other to the atmosphere, means for moving one of said valve members out of its relative neutral position with respect to the other valve member, means responsive to operation of said motor for moving said other valve member to tend to restore it to said relative neutral position, and means for resisting movement of said first named valve member in either direction from said relative neutral position, said last named means being constructed and arranged to be inoperative when said valve members are in relative neutral positions.

23. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of freely independently movable valve members normally arranged in relative neutral positions balancing pressures in the ends of said motor and operative when out of said relative neutral positions to connect either end of said motor to said source and the other to the atmosphere, means for moving one of said valve members out of its relative neutral position with respect to the other valve member, means responsive to operation of said motor for moving said other valve member to tend to restore it to said relative neutral position, and means responsive to differential pressures in said motor for resisting movement of said first named valve member away from said relative neutral position, said last named means being constructed and arranged to be inoperative when said valve members are in relative neutral positions.

24. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of freely independently movable valve members normally arranged in relative neutral positions balancing pressures in the ends of said motor and operative when out of said relative neutral position to connect one end of said motor to said source and the other end to the atmosphere to generate a force in said motor to move said shiftable member, means for moving one of said valve members out of its relative neutral position with respect to the other valve member, means responsive to operation of said motor for moving said other valve member to tend to restore it to said relative neutral position, and means for applying a smaller and substantially proportional force opposing all relative movements of said valve members in a direction away from said relative neutral position simultaneously with the application of said first mentioned force whereby any such movement of said first named valve member will be resisted to a degree substantially proportional to the resistance encountered by said shiftable member, said last named means being constructed and arranged to be inoperative when said valve members are in relative neutral positions.

25. The combination with a transmission having a shiftable transmission operating member movable in opposite directions from a neutral position into different transmission setting positions, of a differential fluid pressure motor, motion transmitting means connected between said motor and said shiftable member, a source of non-atmospheric pressure, a floating valve mechanism comprising a pair of freely independently movable valve members normally arranged in relative neutral positions balancing pressures in the ends of said motor, a manually movable control member connected to move one of said valve members out of its relative neutral position to connect either end of said motor to said source and the other end to the atmosphere, the other of said valve members being connected to said motion transmitting means whereby operation of said motor tends to restore said other valve member to said relative neutral position, and means for resisting movement of said first named valve member out of said relative neutral position, said last named means being constructed and arranged to be inoperative when said valve members are in relative neutral positions.

26. The combination with a transmission having a shiftable transmission operating member movable in opposite directions from a neutral position into different transmission setting positions, of a differential fluid pressure motor connected to said shiftable member, a source of non-atmospheric pressure, a floating valve mechanism comprising a pair of freely independently movable valve members normally arranged in relative neutral positions balancing pressures in the ends of said motor and operative when out of said relative neutral positions to connect either end of said motor to said source and the other to the atmosphere, manual means for moving one of said valve members out of its relative neutral position with respect to the other valve member, means responsive to operation of said motor for moving said other valve member to tend to restore it to said relative neutral position, and means for effecting a force reaction on the manual means substantially proportional to the force developed by the fluid pressure motor, said last named means being constructed and arranged to be inoperative when said valve members are in relative neutral positions.

HENRY W. HEY.